(12) United States Patent
Berghaus et al.

(10) Patent No.: US 10,655,763 B2
(45) Date of Patent: May 19, 2020

(54) PIPE CONNECTION

(71) Applicant: VOSS Fluid GmbH, Wipperfurth (DE)

(72) Inventors: Gerd Berghaus, Kurten (DE); Harald Pott, Huckeswagen (DE)

(73) Assignee: VOSS Fluid GmbH, Wipperfurth (DE)

( * ) Notice: Subject to any disclaimer, the term of this patent is extended or adjusted under 35 U.S.C. 154(b) by 792 days.

(21) Appl. No.: 14/892,958

(22) PCT Filed: May 8, 2014

(86) PCT No.: PCT/EP2014/059407
§ 371 (c)(1),
(2) Date: Mar. 30, 2016

(87) PCT Pub. No.: WO2014/187675
PCT Pub. Date: Nov. 27, 2014

(65) Prior Publication Data
US 2016/0223107 A1    Aug. 4, 2016

(30) Foreign Application Priority Data
May 23, 2013  (DE) .......................... 10 2013 105 300

(51) Int. Cl.
*F16L 19/028* (2006.01)
*B21D 41/02* (2006.01)
(Continued)

(52) U.S. Cl.
CPC ........ *F16L 19/0283* (2013.01); *B21D 17/025* (2013.01); *B21D 41/02* (2013.01); *B21J 5/08* (2013.01); *B21J 9/025* (2013.01)

(58) Field of Classification Search
CPC ............................ F16L 19/028; F16L 19/0283
(Continued)

(56) References Cited

U.S. PATENT DOCUMENTS

| 6,431,613 B1 * | 8/2002 | Altenrath ............. F16L 19/028 |
| | | 285/354 |
| 2002/0190523 A1 * | 12/2002 | Berghaus ............ F16L 19/0283 |

(Continued)

FOREIGN PATENT DOCUMENTS

| DE | 225480 A1 | 7/1985 |
| DE | 19511063 A1 | 11/1995 |

(Continued)

*Primary Examiner* — Zachary T Dragicevich
(74) *Attorney, Agent, or Firm* — Eric J. Sosenko; Jonathan P. O'Brien; Honigman LLP (57) ABSTRACT

A pipe connection for connecting metal thin-walled pipeline. The pipeline has a shaped connecting segment that increases from the end of the connecting segment in the form of a frustum forming a circumferential sealing surface and a shoulder defining a stop surface adjacent to the sealing surface. The pipe connection also includes a connection stub having a connection thread and a connection bore, which decreases in size and defines a circumferential connection surface for contacting the sealing surface. A union threaded part includes a clamping thread and a passage opening, which has, on the inner circumference, a circumferential clamping surface for contacting the stop surface. The cone angle of the connecting segment in the region of the sealing surface and the cone angle of the connection bore in the region of the connection surface are in the range of about 38° to 50°.

18 Claims, 8 Drawing Sheets

(51) Int. Cl.
*B21J 5/08* (2006.01)
*B21J 9/02* (2006.01)
*B21D 17/02* (2006.01)

(58) Field of Classification Search
USPC .................. 285/332, 334.5, 354, 382.5, 386
See application file for complete search history.

(56) References Cited

U.S. PATENT DOCUMENTS

| | | |
|---|---|---|
| 2005/0081935 A1* | 4/2005 | Shimizu .............. F16L 19/0283 |
| 2006/0042710 A1 | 3/2006 | Furugen |
| 2010/0225109 A1* | 9/2010 | Swift .................. F16L 19/0283 |
| 2011/0204623 A1 | 8/2011 | Weick et al. |
| 2015/0008669 A1* | 1/2015 | Makino .............. F16L 19/0283 |
| | | 285/354 |

FOREIGN PATENT DOCUMENTS

| | | |
|---|---|---|
| DE | 10108309 C1 | 3/2002 |
| DE | 202005017913 U1 | 1/2006 |

\* cited by examiner

PIPE CONNECTION

CROSS-REFERENCE TO RELATED APPLICATIONS

This application is the U.S. national phase of PCT Application No. PCT/EP2014/059407 filed on May 8, 2014, which claims priority to DE102013105300.9 filed on May 23, 2013, the disclosures of which are incorporated in their entirety by reference herein.

TECHNICAL FIELD

The present invention relates to a pipe connection for connecting an in particular metallic thin-walled pipeline, comprising a pipeline having a formed connection portion which emanating from the connection end thereof increases in a truncated-cone shaped manner at a cone angle and there on the outer circumferential face thereof forms an encircling sealing face and, adjoining thereto, has a shoulder having a locating face, and a connector port having a connector thread and a connector bore which emanating from the opening thereof decreases in a truncated-cone shaped manner at a cone angle which is adapted to the cone angle of the sealing face and there on the inner circumference forms an encircling connector face for bearing on the sealing face, and a collar screw part having a tension thread and having a through opening which on the inner circumference has an encircling tension face for bearing on the locating face. The present invention also relates to a pipeline and a connector port for pipelines of this type.

BACKGROUND

Pipe connections as described above are used in hydraulic systems in machinery and vehicle engineering, for example.

A pipe connection of this type is generally known from DD 240 059 A1, for example. In this pipe connection use is made of a pipeline of which the cone angle of the sealing face of the connection portion of the pipeline and the cone angle of the connector bore in the region of the connector face of the connector port is up to 24°.

Pipe connections of this type are used for pipelines having pipe pressures of up to 800 bar. In order for the tightness of the pipe connection to be reliably ensured at these pipe pressures, sufficiently high axial tension forces have to be transmitted by the collar screw part to the connection portion of the pipeline, in particular to the locating face and the sealing face, and to the connector face of the connector port. The known pipe connections, which are manufactured by forming, have the disadvantage that internal incursions may arise on the sealing face during the forming process, in particular in the case of thin-walled pipelines. This means that the pipe wall during the forming process does not bear on the internal contour of the forming tool, but performs an internal incursion toward the pipe axis. These internal incursions compromise the sealing function of the pipe connection, since the sealing face of the pipeline in the fitted state no longer bears across the entire area on the connector face of the connector port.

SUMMARY

The present invention is based on the object of providing a pipe connection, a pipeline, and a connector port for the pipe connection, so that internal incursions during the forming process in the case of in particular thin-walled pipelines are avoided and, at the same time, the pipe connection is able to provide an adequate sealing function.

This object is achieved according to the invention in that the value of the cone angle of the connector bore in the region of the connector face of the connector port and of the cone angle of the connection portion in the region of the sealing face of the pipeline is 38° to 50°. On account of the steeper cone angle of at least 38°, the sealing face in the direction of ascent may be configured so as to be shorter, while maintaining the height of the shoulder. On account thereof, an internal incursion in the region of the sealing face during the forming process is avoided in particular with thin-walled pipes having a ratio of a wall thickness of the pipe wall of the pipeline to the outer diameter d of the pipeline of $0.04 \leq s/d \leq 0.08$. Moreover, a sufficiently high axial tension force may furthermore be transmitted by the collar screw part to the connection portion of the pipeline, in particular to the locating face and the sealing face, and to the connector face of the connector port, without the connection portion being plastically deformed. Moreover, a sufficiently high clamping force which runs in a perpendicular manner to the sealing face from the sealing face in the direction of the connector face is also ensured at a cone angle $\alpha$ of 38° to 50°. A pipe connection having an improved sealing function is thus provided.

In one further embodiment of the invention the value of the cone angle $\alpha$ of the connector bore and of the connection portion in the region of the sealing face is 38° to 42°, preferably 40°. This enables a particularly good balance to be struck between avoiding internal incursions on the sealing face during the forming process and sizing of the axial tension force and of the clamping force, so that an optimal sealing function of the pipe connection is ensured. According to the invention, it is advantageous for the radial height H of the shoulder to be 0.5 mm to 5 mm, in particular 0.5 mm to 3 mm, preferably 1 mm to 2 mm. The invention is based on the knowledge that the shoulder of the connection portion has to have sufficient height, depending on the diameter and wall thickness of the pipeline, in order for the axial tension forces to be reliably transmitted.

In one further embodiment of the invention, the connection portion from the shoulder up to the original pipe circumference decreases in a truncated-cone shaped manner at a cone angle ß and there on the outer circumferential face thereof forms an encircling locating face, wherein the through opening of the collar screw part adjoining the tension thread decreases in a truncated-cone shaped manner at a cone angle ß which is adapted to the cone angle of the connection portion in the region of the locating face and there on the inner circumference forms an encircling tension face for bearing on the locating face. This offers the advantage that the connection portion of the pipeline is radially clamped during screwing.

In one advantageous further embodiment of the invention the cone angle β is larger than the cone angle α by at least 90°. In particular, the value of the cone angles β, β' of the connection portion in the region of the locating face and of the through opening in the region of the tension face is 120° to 180°, and preferably 140° or 180°, wherein a cone shape is no longer present in the latter case. This prevents conjoint rotation of the pipeline during assembly. Moreover, cone angles of ≥120° enable lower tightening torques during assembly, since the normal force which is perpendicular to the locating face is lower than in the case of cone angles of <120°. In the case of a cone angle of 180°, the friction force is minimized and alignment errors between the partially upset pipe cone and the rear pipe region are compensated for.

In one further embodiment of the invention the collar screw part is configured as a cap screw, wherein the connector thread of the connector port is configured as an internal thread on the inner circumference of the connector bore of the connector port, and the tension thread is configured as an external thread on the outer circumference of the cap screw. This offers the advantage that the pipe contour may protrude further into the connector port, on account of which the axial installation height is lower. In this way a particularly compact structural shape is achieved for a pipe connection according to the invention.

In one further embodiment the connector port is replaced by a profiled bore in a component of a fluid system (for example, a valve block or a device). This enables an even more compact solution and additional cost savings.

Further details, features, and advantageous refinements of the invention are derived from the exemplary embodiments which are described in the following and illustrated in the drawings, and from the dependent claims.

BRIEF DESCRIPTION OF THE DRAWINGS

In the drawings.

Identical parts are always referred to using the same reference signs in the various figures of the drawing.

DETAILED DESCRIPTION

It is understood to be disclosed so as to be relevant to the invention in the following description that the invention is not restricted to the exemplary embodiments, or to all, or a number of, the features of combinations of features described; rather, it is also possible for any individual sub-feature of the/each exemplary embodiment to have inventive importance in its own right, separately from all the other sub-features described in conjunction therewith, and also in combination with any other desired features of another exemplary embodiment as well as independently of the combinations of features and dependency references of the claims, and in combination with the features of claim 1.

Figure 1:
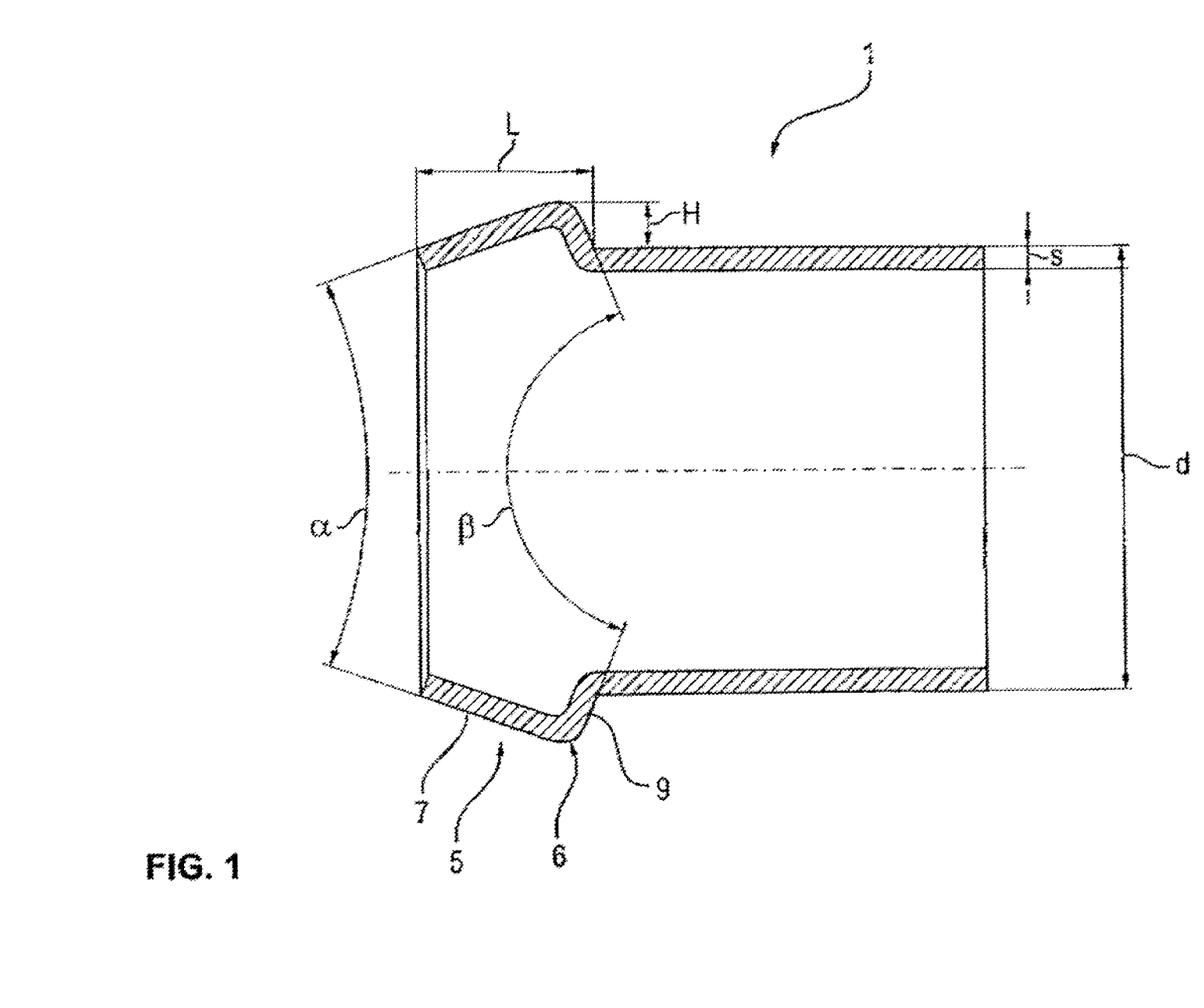
FIG. 1 shows a cross section of an embodiment of a pipeline for a pipe connection according to the invention.

An embodiment of a pipeline 1 for a pipe connection according to the invention is illustrated in FIG. 1. The pipeline 1 is configured as an in particular thin-walled pipeline 1. The pipeline 1 is configured using metallic primary materials, in particular using steel, copper, brass, or stainless steel. In the context of the invention, thin-walled pipelines 1 are considered to be pipelines 1 in which the ratio of the wall thickness s of the pipe wall 3 to the outer diameter d of the pipeline 1 is $0.04 \leq s/d \leq 0.08$.

The pipeline 1 at the connection end thereof has a formed connection portion 5 having a length L. The connection portion 5 emanating from the connection end of the pipeline 1 is configured in a truncated-cone shape so as to increase to a maximum circumference and on the circumference of the pipeline 1 forms a shoulder 6 having a height H. The height H of the shoulder in pipelines according to the invention is 0.5 mm to 5 mm, in particular 0.5 mm to 3 mm, preferably 1 mm to 2 mm, depending on the diameter and the wall thickness of the pipeline. The region of the connection portion 5 which increases in a truncated-cone shaped manner on the outer circumferential face thereof forms an encircling sealing face 7. The sealing face 7 and the shoulder 6 directly transcend into one another. The connection portion 5 in the region of the sealing face 7 has a cone angle α. In the embodiment illustrated the connection portion 5 is further configured so as to emanate from the shoulder 6 and having a maximum circumference and to decrease in a truncated-cone shaped manner down to the original pipe circumference. The region of the connection portion 5 which decreases in a truncated-cone shaped manner on the outer circumferential face thereof forms an encircling locating face 9. The connection portion 5 in the region of the locating face 9 has a cone angle β. As an alternative to the region which decreases in a truncated-cone shaped manner, the connection portion 5 may also form a locating face on the maximum circumference, which is perpendicular to the pipe axis.

Figure 2:
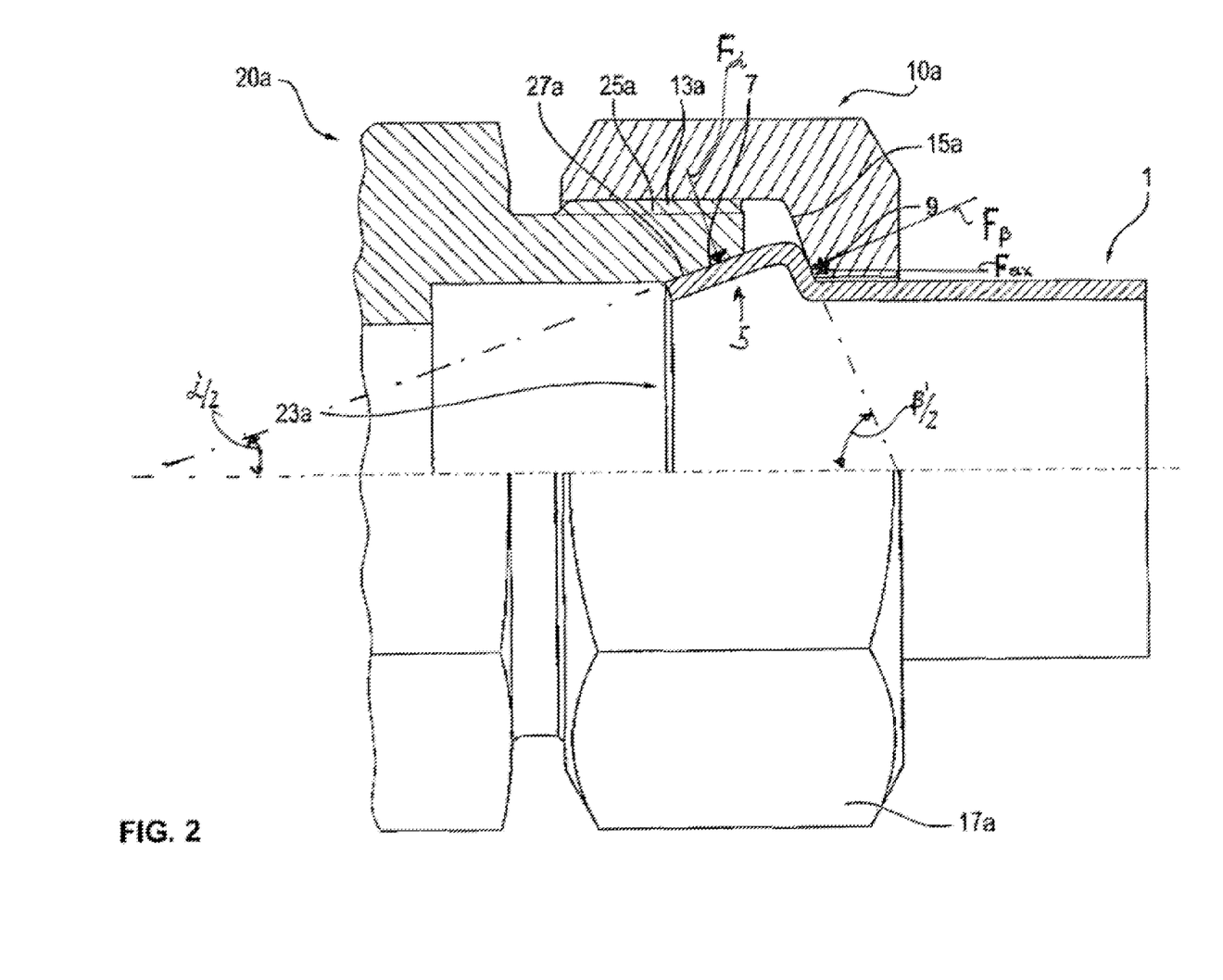
FIG. 2 shows a side view with a partial cross section of a first embodiment of a pipe connection according to the invention.

A first embodiment of a pipe connection according to the invention is illustrated in an assembled state in FIG. 2. The pipe connection comprises a pipeline 1 according to FIG. 1, a first embodiment of a collar screw part which is configured as a cap nut 10a, and a first embodiment of a connector port 20a which is configured in a correspondingly matching manner.

The cap nut 10a comprises a through opening by way of which the cap nut 10a is push-fitted onto the pipeline 1. At that side that faces the connector port 20a the cap nut 10a is configured in a hollow-cylindrical manner and has a tension thread 13a which is configured as an internal thread. Adjoining the tension thread 13a, the through opening has a region which decreases in a truncated-cone shaped manner and which on the inner circumference of the cap nut 10a forms a tension face 15a. The through opening in the region of the tension face 15a has a cone angle β' which is adapted to the cone angle β of the connection portion 5 in the region of the locating face 9 of the pipeline 1. As an alternative to the region of the through opening which decreases in a truncated-cone shaped manner, the cap nut 10a may also form a tension face which is perpendicular to the pipe axis. A further hollow-cylindrical region by way of which the cap nut 10a is movably located on the outer circumference of the pipeline 1 adjoins the region of the through opening which decreases in a truncated-cone shaped manner. An external hexagonal feature 17a is disposed on the outer circumference of the cap nut, as a contact surface for a screwing tool.

The connector port 20a is configured in a hollow-cylindrical manner and on that side thereof that faces the cap nut 10a comprises a connector bore 23a for receiving the pipeline 1, and on the outer circumference of the connector bore 23a comprises a connector thread 25a, which is configured as an external thread, for screwing the cap nut 10a to the connector port 20a. The connector bore 23a, emanating from the end side of the connector port 20a, is configured so as to decrease inwardly in a truncated-cone shaped manner, wherein the inner circumference of the connector port 20a in this region forms a connector face 27a. The connector bore 23a in the region of the connector face 27a has a cone angle α' which is adapted to the cone angle α of the sealing face 7 of the pipeline 1. A hollow-cylindrical region of the connector bore 23a, the inner diameter of which corresponds to the smallest inner diameter of the connector face 27a, adjoins the truncated-cone shaped region of the connector bore 23a.

That end of the connector port 20a that faces away from the pipeline 1 is not illustrated in FIG. 1 and may be configured both as a connector for a component of a fluid system (for example, a valve block or a device) or be configured as a connector for a further pipeline in a mirror image of the illustrated end, having a further connector bore 23a and a further connector thread 25a.

The pipeline 1 by way of the connection portion 5 thereof is inserted into the connector bore 23a of the connector port 20a, wherein the cap nut 10a having the tension thread 13a is screwed onto the connector thread 25a of the connector port 20a. When the cap nut 10a is screwed to the connector port 20a, an axial tension force $F_{ax}$ acts by means of the tension face 15a of the cap nut 10a on the locating face 9 of the pipeline 1, so that the sealing face 7 of the pipeline 1 is urged toward the connector face 27a of the connector port 20a such that the sealing face 7 bears on the connector face 27a in a tight manner.

The connection portion 5 of the pipeline 1 is molded onto the pipeline 1 in particular by way of axial upsetting methods or tumbling methods which are described hereinbelow. In the case of these manufacturing methods the problem arises in particular in thin-walled pipelines 1 that internal incursions may arise on the sealing face 7 during the forming process if and when the length of the sealing face 7 along the ascent exceeds a certain length which depends on the diameter, wall thickness, and material of the pipeline. These internal incursions compromise the sealing function of the pipe connection, since the sealing face 7 of the pipeline in the assembled state no longer bears across the entire area on the connector face 27a of the connector port 20a. It has been demonstrated by experiments that the internal incursions on the sealing face 7 during manufacturing of the connection portion 5 may be avoided by shortening the axial length of the sealing face 7. However, in the case of a given cone angle α of the connection portion 5 in the region of the sealing face 7 the height of the shoulder 6 has to be reduced thereby. However, this compromises the maximum possible transmission of an axial force $F_{ax}$ to the pipeline 1 when the collar screw part is being screwed, such that the pipeline may be damaged and the tightness of the pipe connection is compromised. However, if and when the cone angle α of the connection portion 5 is increased the length of the sealing face 7 may be shortened without modifying the height H of the shoulder 6 of the connection portion 5. However, the clamping force $F_{cl}$, which runs perpendicular to the sealing face 7 in the direction of the connector face 27a, decreases on the sealing face 7 as the cone angle α, α' increases, so that the sealing function is no longer adequately ensured once a certain value of the cone angle α, α' has been reached.

According to the invention, the connection portion 5 in the region of the sealing face 7, and the connector bore 23a in the region of the connector face 27a have a cone angle α or α', respectively, which has a value of 38° to 50°, in particular 38° to 42°. In the preferred embodiment illustrated one of the cone angles α, α'=40°. On account thereof, the forming length of the pipeline 1 is reduced and the instability of the pipeline 1 is thus reduced, and an internal incursion on the sealing face 7, in particular also in the case of the thin-walled pipes described above, during the forming process is avoided. At the same time, using cone angles α, α' of this type, a sufficient height H of 0.5 mm to 5 mm, in particular of 0.5 mm to 3 mm, preferably 1 mm to 2 mm, of the shoulder 6, and a sufficiently high clamping force $F_{cl}$ which points so as to be perpendicular to the sealing face 7, are ensured, such that the pipeline is not damaged during screwing and an adequate sealing function is ensured, and the sealing face 7 and the connector face 27a bear on one another across the entire area.

Moreover, the cone angles α, α'≥38° to 50° ensure that the pipeline 1 in the final position is subject to less deformation and an increase in force is clearly perceptible when the final position is reached.

In order to avoid conjoint rotation of the pipeline 1 with the connector port 20a during assembly, when the collar screw part, in particular the cap nut 10a, is being screwed, it is advantageous for the cone angle β of the connection portion 5 in the region of the locating face 9, and the cone angle β' of the through opening of the cap nut 10a in the region of the tension face 15a, to be larger than the cone angles α, α' of the connection portion 5 in the region of the sealing face 7, and of the connector bore 23a in the region of the connector face 27a, by at least 90°. According to the invention the value of the cone angles β, β' is in a range of 120° to 180°. The cone angles β,β' are preferably 180°, on account of which friction forces are minimized and a compensation of alignment errors is achieved. In the embodiment illustrated the cone angles β, β'=140°. This prevents conjoint rotation of the pipeline 1 during assembly. Moreover, a large cone angle having β, β'≥120° enables lower tightening torques during assembly, since the normal force $F_p$ which is perpendicular to the locating face 9 is lower than in the case of smaller cone angles β, β'. However, a cone angle β, β'<180° has additional advantages, since this ensures radial clamping of the pipe on the locating face 9.

Figure 3:
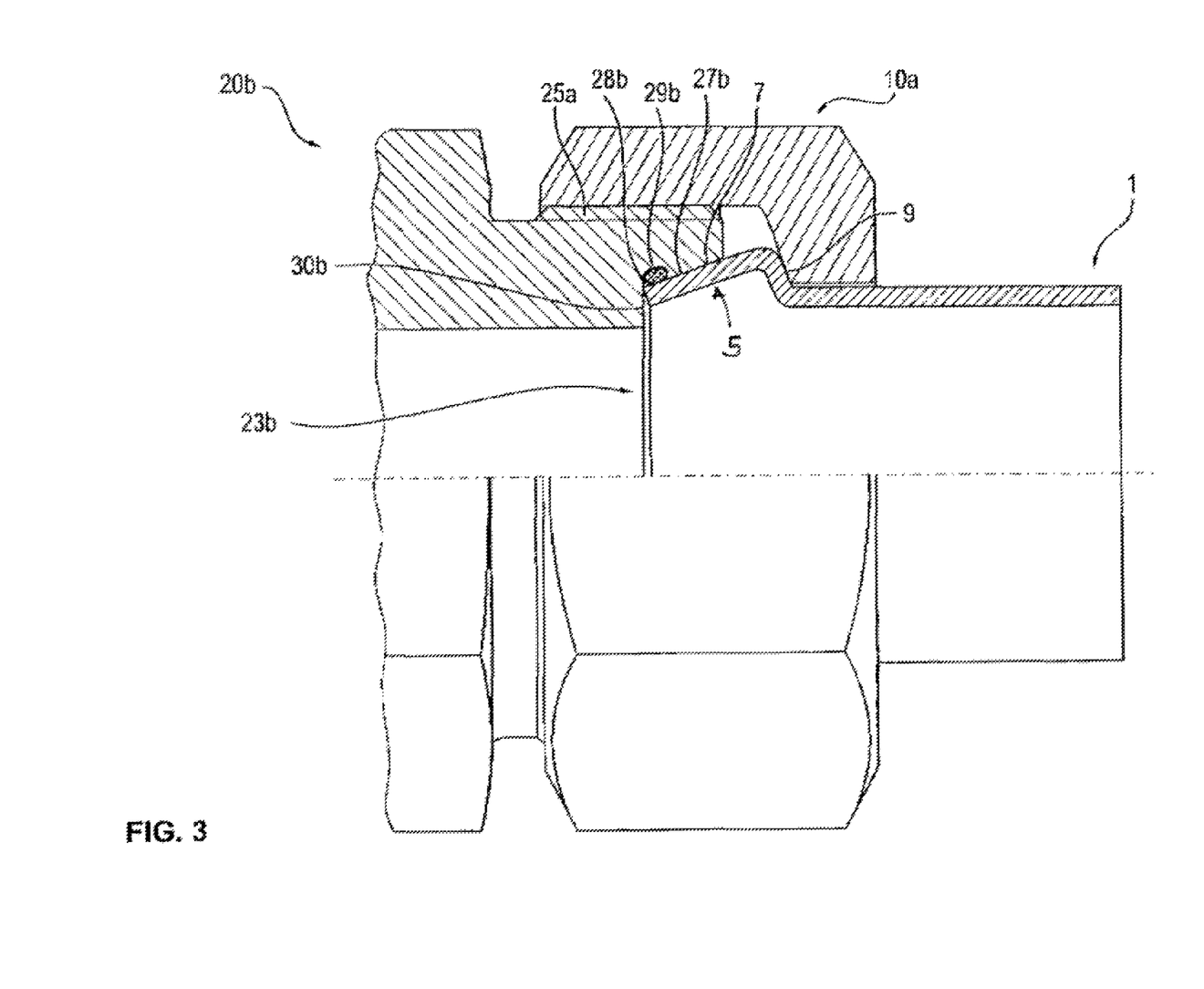
FIG. 3 shows a side view with a partial cross section of a second embodiment of a pipe connection according to the invention.

The second embodiment according to the invention as per FIG. 3 differs from the first embodiment according to FIG. 2 in particular in the design of the connector bore 23b of the connector port 20b. The connector bore 23b emanating from the end side of the connector port 20b is likewise configured so as to inwardly decrease in a truncated-cone shaped manner, wherein the inner circumference of the connector port 20b in this region forms a connector face 27b. The connector bore 23b in the region of the connector face 27b has a cone angle α' which is adapted to the cone angle α of the connection portion 5 in the region of the sealing face 7 of the pipeline 1.

An encircling sealing groove 28b for receiving a seal 29b is located at the end of the connector face 27b. A hollow-cylindrical region of which the inner diameter is smaller than the smallest inner diameter of the connector face 27b adjoins the sealing groove 28b, such that an advantageously encircling locating face 30b is formed so as to adjoin the sealing groove 28b in the connector bore 23b, which axially delimits the receptacle of the pipeline 1 in the connector bore 23b. This offers the advantage that the final point of assembly during assembly may be more easily identified by way of an increase in force.

That end of the connector port 20b that faces away from the pipeline 1 is not illustrated in FIG. 3 and may be configured both as a connector for a component of a fluid system (for example, a valve block or a device) or be configured as a connector for a further pipeline 1 in a mirror image of the illustrated end, having a further connector bore 23a and a further connector thread 25a.

Figure 4:
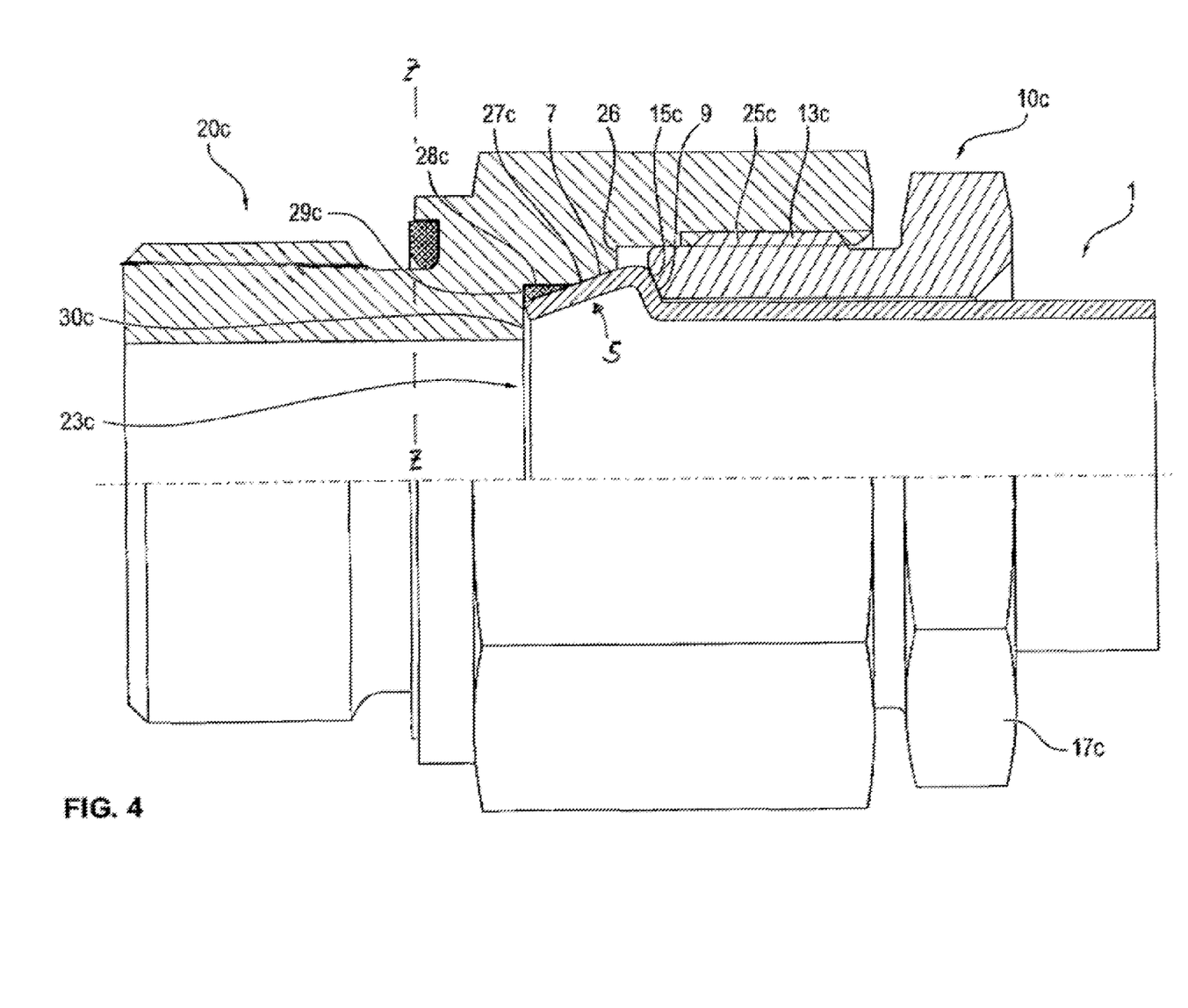
FIG. 4 shows a side view with a partial cross section of a third embodiment of a pipe connection according to the invention.

A third embodiment of a pipe connection according to the invention is illustrated in FIG. 4. This embodiment comprises a pipeline 1 according to FIG. 1, and a collar screw part which is configured as a cap screw 10c, and a connector port 20c.

The cap screw 10c comprises a through opening by way of which the cap screw 10c is push-fitted onto the pipeline 1. At that side of the through opening that faces the connector port 20c, the cap screw 10c has a tension thread 13c which is configured as an external thread.

Adjoining the tension thread 13c, an external hexagonal feature 17c is disposed on the outer circumference as a contact surface for a screwing tool. The end face of the cap screw 10c, which faces the connector port 20c, forms a through opening which inwardly tapers off in a truncated-cone shaped manner and which forms a tension face 15a on the inner circumference. The through opening in the region of the tension face 15c has a cone angle β' which is adapted to the cone angle β of the connection portion 5 in the region of the locating face 9 of the pipeline 1. As an alternative to the tension face 15c which tapers off in a truncated-cone shaped manner, a tension face which is perpendicular to the pipe axis may also be configured. A hollow-cylindrical region by way of which the cap screw 10c is movably located on the outer circumference of the pipeline 1 adjoins the region of the through opening which tapers off in a truncated-cone shaped manner.

The connector port 20c is configured in a hollow-cylindrical manner and on that side thereof that faces the cap screw 10c comprises a connector bore 23c for receiving the pipeline 1, and on the inner circumference of the connector bore 23c comprises a connector thread 25c, which is configured as an internal thread, for screwing the cap screw 10c to the connector port 20c. An inwardly protruding and encircling appendage 26 is disposed in the connector bore 23c, so as to adjoin the connector thread 25c on the inner circumference. Adjoining thereto, the connector bore 23c is configured as a region which inwardly tapers off in a truncated-cone shaped manner and which on the inner circumference thereof forms a connector face 27c. The connector bore 23c in the region of the connector face 27c has a cone angle α' which is adapted to the cone angle α of the connection portion 5 in the region of the sealing face 7 of the pipeline 1.

A hollow-cylindrical sealing region 28c in which a gasket 29c is disposed adjoins the end of the connector face 27c. The gasket 29c is configured in such a manner that it adapts to the cone angle α of the connection portion 5 in the region of the sealing face 7 of the pipeline 1. A further hollow-cylindrical region of which the inner diameter is smaller than the inner diameter of the sealing face 28c adjoins the sealing region 28c, so that, adjoining the sealing region 28c, an encircling locating face 30c which axially delimits the receptacle of the pipeline 1 in the connector bore 23c is formed in the connector bore 23c. This offers the advantage that the final point of assembly during assembly may be more easily identified by way of an increase in force.

That end of the connector port 20c that faces away from the pipeline 1 in FIG. 4 is illustrated so as to be configured as a connector for a component of a fluid system (for example, a valve block or a device). Alternatively, it could also be configured as a connector for a further pipeline 1 in a mirror image, having a further connector bore 23c and a further connector thread 25c.

In the third embodiment according to FIG. 4, the connector point for the pipe contour is closer to the screw-in plane Z-Z, on account of which the axial installation height, for example up to the start of a pipe elbow, is considerably smaller. In this way, a particularly compact structural shape for a pipe connection according to the invention is achieved.

Figure 5:
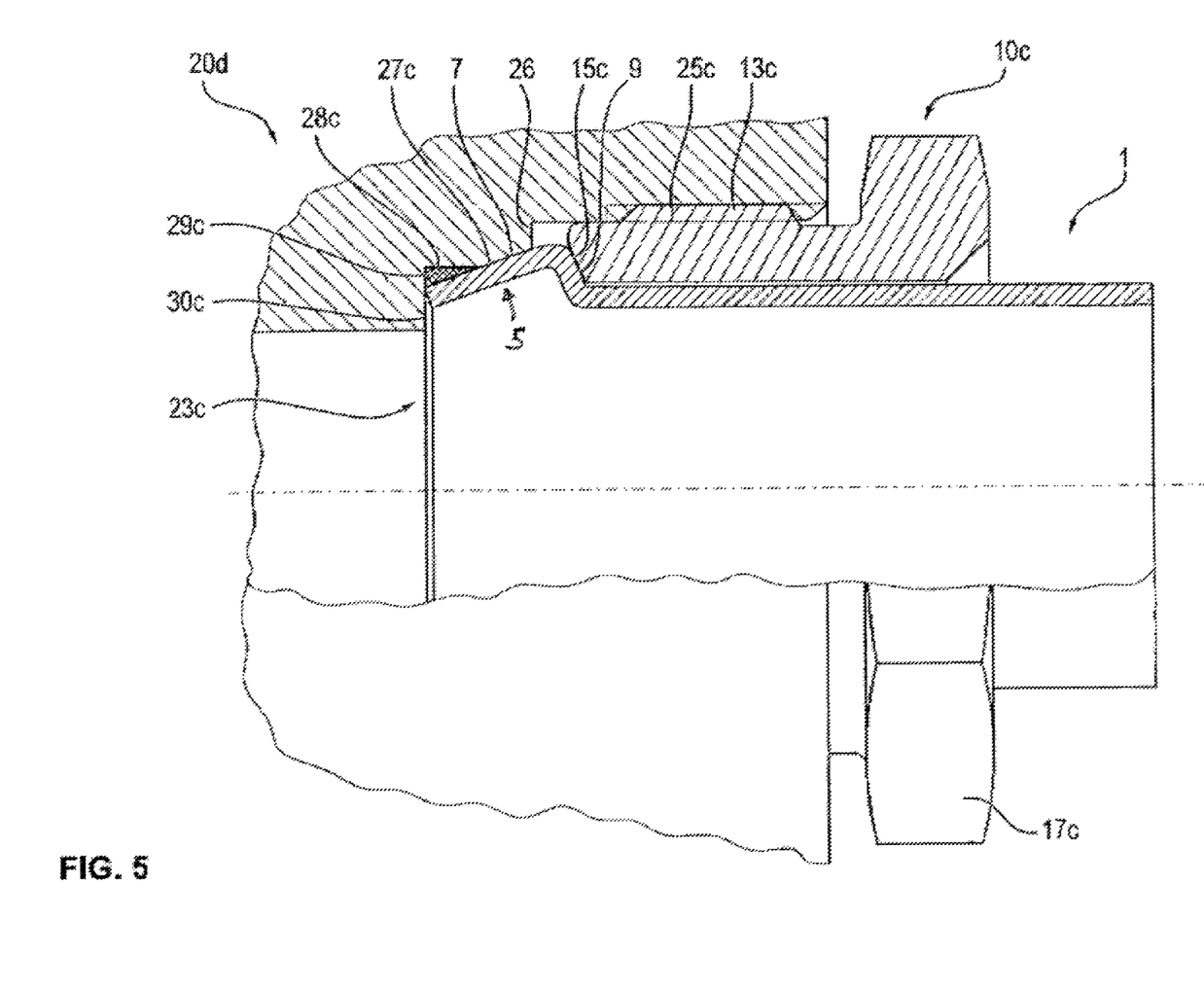
FIG. 5 shows a side view with a partial cross section of a fourth embodiment of a pipe connection according to the invention.

A fourth embodiment of a pipe connection according to the invention is illustrated in FIG. 5. This embodiment in principle is constructed like the third embodiment in FIG. 4, having the same connector bore 23c, the same connector thread 25c, and the same cap screw 10c. However, in this embodiment the connector bore 23c is not located in a special connector port but in a component of a fluid system (for example, a valve block or a device) 20d. This enables a configuration of a pipe connection according to the invention which is even more cost-effective and space-saving.

Figure 8:
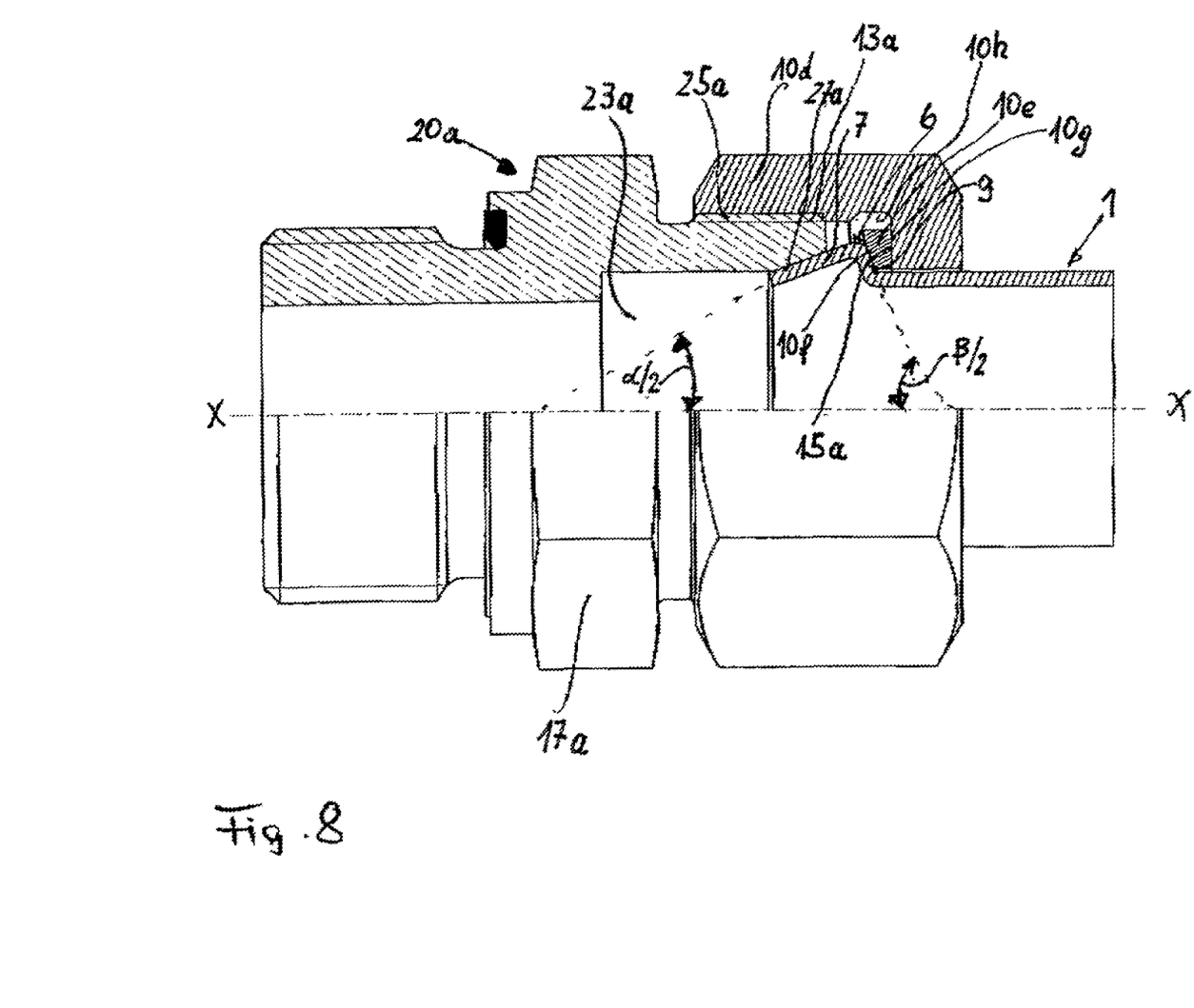
FIG. 8 shows a side view in a partial cross section of a further embodiment of a pipe connection according to the invention.

A further embodiment of a pipe connection according to the invention is illustrated in FIG. 8. Here, identical parts or parts having an identical function to parts contained in FIGS. 1 to 6 are identified using the same reference signs.

In this embodiment a baffle ring 10e is disposed between the tension face 15a of the collar screw part 10d, which faces the connector port 20a, and the locating face 9 of the pipeline 1. The baffle ring 10e has a mating face 10f which in the tightened state bears on the locating face 9 and which in its inclination in relation to the longitudinal axis X-X of the pipe connection is adapted in such a manner to the inclination of the locating face 9 according to the cone angle β that a transmission of force across the entire area may be performed. The baffle ring 10e furthermore has a bearing face 10g which lies opposite the tension face 15a of the collar screw part 10d. Preferably, the tension face 15a and the bearing face 10g run so as to be perpendicular to the longitudinal axis X-X of the pipe connection. In order for the baffle ring 10e to be received or positioned, respectively, the collar screw part 10d has a clearance 10h which is concentric with the longitudinal axis X-X and in the cross-section is circular and which is disposed in the extension of the tension thread 13a. The baffle ring 10e according to the invention has the effect that material burrs which on account of the high forming pressures may be created between the segments 43 of the tension element 42 on the locating face 9 during forming of the pipeline 1 are not lodged in the collar screw part 10d, on account of which the risk of the pipeline 1 according to the invention potentially being conjointly rotated when the collar screw part 10d is screwed on during the final assembly is eliminated. The baffle ring 10e according to the invention may positively prevent conjoint rotation of this type. On account of the slightly conical locating face 9 on the pipeline 1, and of the mating face 10f of the baffle ring 10e, which is designed in an identically conical manner, for example at an angle β of 140°, for example, the baffle ring 10e may be centered in relation to the pipeline 1. On account of the radially running bearing face 10g of the baffle ring 10e and of the correspondingly oriented tension face 15a of the collar screw part 10d, the friction forces on both contact faces are minimized. A baffle ring according to the invention may also be disposed between the tension face 15c and the locating face 9 in the embodiment according to FIGS. 4, 5, wherein the tension face 15c here may run so as to be perpendicular to the longitudinal axis X-X and the locating face 9 may preferably run in a conical manner and the baffle ring then has correspondingly running contact faces, for example.

As already mentioned hereinabove, the pipeline 1 according to the invention is manufactured by means of an axial upsetting method or of a tumbling method.

Figure 6:
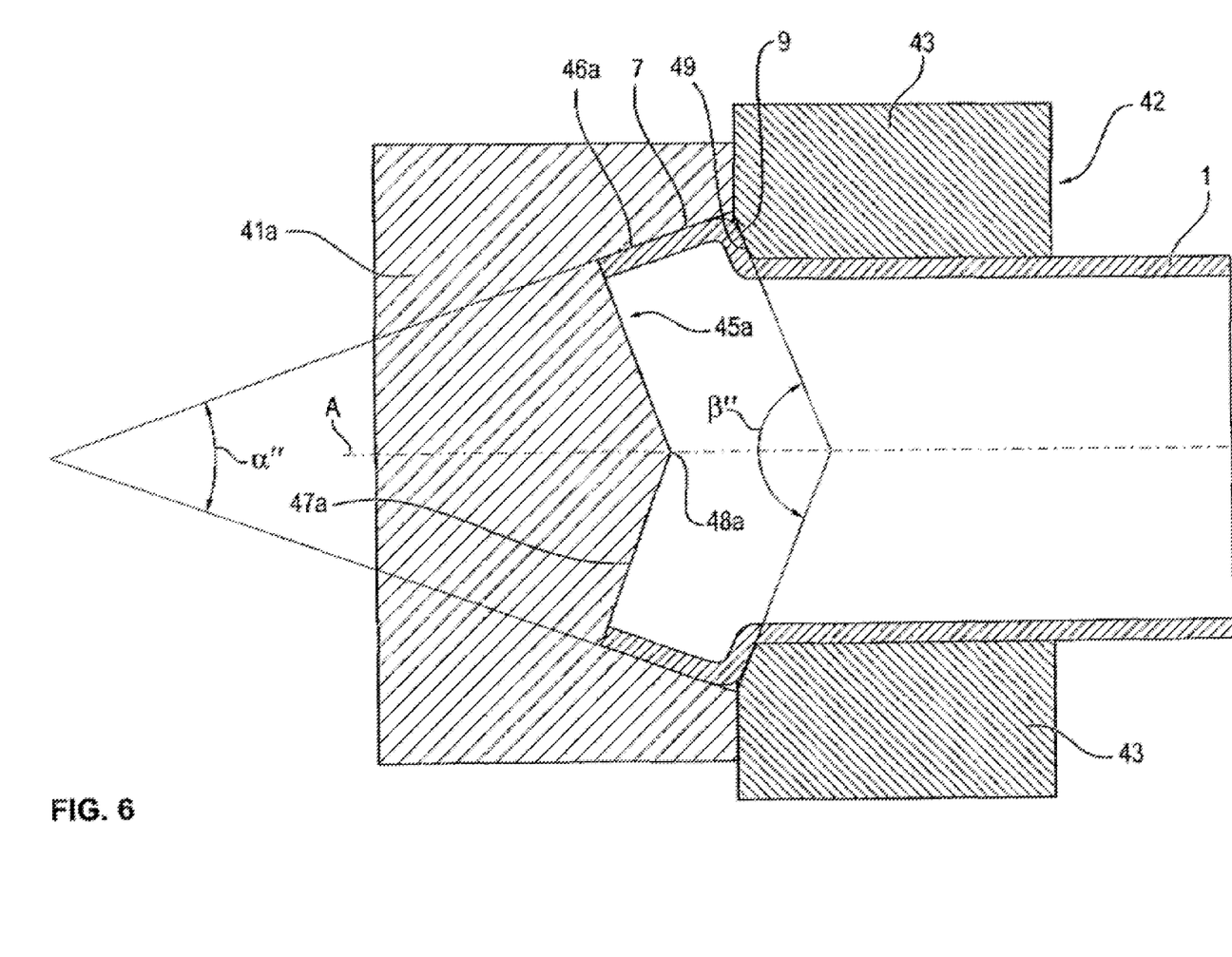
FIG. 6 shows a cross section of an embodiment of a tool for manufacturing a pipeline according to the invention by means of the axial-upset method.

A tool for manufacturing a pipeline 1 according to the invention and to FIG. 1 by means of an axial upsetting method using an already formed pipeline 1 is illustrated in FIG. 6. The tool is composed of an upsetting tool 41a and a tension element 42. The upsetting tool 41a shapes the sealing face 7 of the pipeline 1. The tension element 42 shapes the locating face 9 of the pipeline 1. The axis A of the upsetting tool 41a is disposed so as to align with the axis A of the pipeline 1, wherein the upsetting tool 41a is axially movably mounted.

The upsetting tool 41a at that side that is assigned to the tension element 42 has a depression 45a for receiving an end portion of a pipeline 1 to be formed. The depression 45a at the periphery thereof is configured so as to be truncated-cone shaped and having a cone angle $\alpha''$ which is adapted to the cone angle $\alpha$ of the connection portion 5 of the pipeline 1 in the region of the sealing face 7. The depression 45a on the encircling periphery thereof forms a shaping face 46a. The base 47a of the depression 45a from the periphery of the encircling shaping face 46a in the direction of the tension element 42 runs in a truncated-cone shaped pointed manner and forms a tip 48a which is aligned with the axis of the pipeline 1 to be formed. The cone angle of the base $180°-\alpha''$ here is such that the cone face of the base 47a in relation to the shaping face 46a is at an angle of 90°. The diameter of the depression 45a is adapted to the pipe diameter of the pipeline 1 to be formed. The tension element 42 is composed in particular of a plurality of segments 43 which may be opened and closed in a radial manner and which tension or fix the pipeline 1 in the axial and radial directions, respectively. The tension element 42 at that side that faces the upsetting tool 41a forms a truncated-cone shaped opening having a cone angle $\beta''$ which is adapted to the cone angle $\beta$ of the connection portion 5 of the pipeline 1 in the region of the locating face 9. A second shaping face 49 is formed on the circumference of the truncated-cone shaped opening. In the axial upsetting method, the upsetting tool 41 which is disposed in the pipe axis presses in an axial manner against the end piece of the pipeline 1 to be formed and forms the contour of the pipeline 1. Here, the pipeline 1 is held in a force-fitting and/or form-fitting manner behind the forming point by the segments 43 of the tension element 42.

Figure 7:
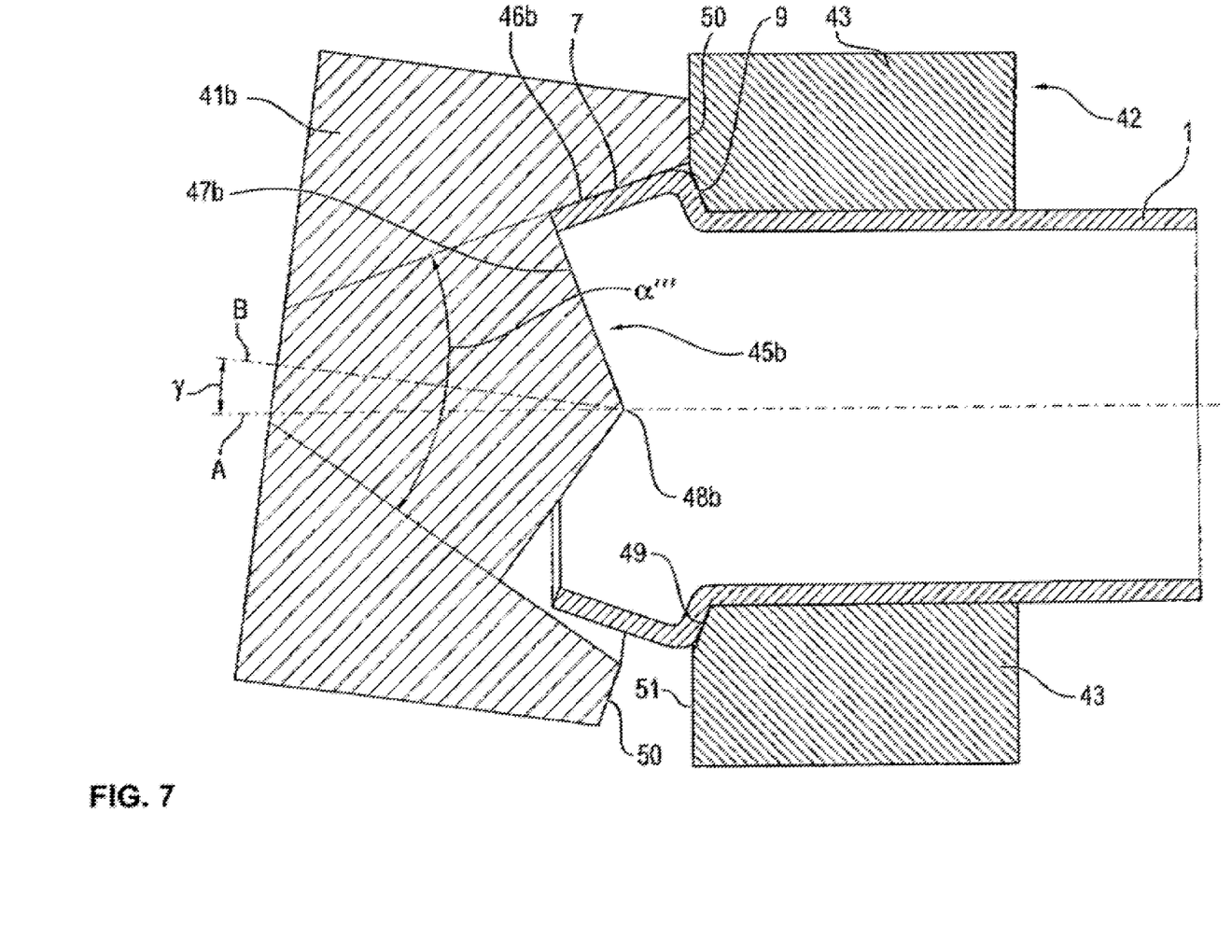
FIG. 7 shows a cross section of an embodiment of a tool for manufacturing a pipeline according to the invention by means of the tumbling method.

A tool for manufacturing a pipeline 1 according to the invention and to FIG. 1 by means of a tumbling method using an already formed pipeline 1 is illustrated in FIG. 7. The tool is composed of a tumbling tool 41b and the same tension element 42 as has already been described in the case of the axial upsetting method. The tumbling tool 41b shapes the sealing face 7 of the pipeline 1. The tumbling tool 41b has a central rotation axis B about which the tumbling tool 41b is mounted so as to be freely movable in a machine in the rotation direction, such that said tumbling tool 41b may roll on the circumference of the pipeline 1. Moreover, the tumbling tool 41b is mounted so as to be rotatable about the pipe axis A and axially movable along the pipe axis A. The rotation axis B is disposed so as to be oblique in relation to the pipe axis A and in relation to the pipe axis A has a tumbling angle $\gamma$. The tumbling angle $\gamma$ in particular is between 2° and 20°. The tumbling angle $\gamma$ in the illustrated tumbling tool 41b is 8°.

The tumbling tool 41b on that side that faces the tension element 42 has a depression 45b for receiving an end portion of a pipeline 1 to be formed. The depression 45b at the periphery thereof is configured so as to be truncated-cone shaped and having a cone angle $\alpha'''$ which is adapted in such a manner to the cone angle $\alpha$ of the connection portion 5 of the pipeline 1 in the region of the sealing face 7 and to the tumbling angle $\gamma$ that $\alpha'''=\alpha+2\gamma$. The depression 45b on the encircling periphery thereof forms a shaping face 46b. A base 47b of the depression 45b from the periphery of the encircling shaping face 46b in the direction of the tension element 42 runs in a truncated-cone shaped pointed manner and forms a tip 48b which lies in the axis A of the pipeline 1. The cone angle of the base here is $180°-\alpha'''$, so that the cone face of the base 47b in relation to the shaping face 46b is at an angle of 90°. The diameter of the depression 45b is adapted to the pipe diameter of the pipeline 1 to be formed. The tumbling tool 41b in the peripheral regions 50 which enclose the opening of the depression 45b and have the tumbling angle $\gamma$ is conically configured, so that a peripheral region 50 which during rotation in each case bears on the tension element 42 runs parallel with the end side 51 of the tension element 42. In the tumbling method the tumbling tool 41b is rotatably driven about the pipe axis A and at the same time indexed in the axial direction along the pipe axis A toward the end piece of the pipeline 1. Here, the rotating tumbling tool 41b which is disposed so as to be oblique in relation to the pipe axis A presses against the end piece of the pipeline 1 only in a localized manner at one point of the circumference and shapes the contour of the pipeline 1, wherein the pipeline 1 is likewise held behind the forming point by the tension element 42. The tumbling method offers the advantage of being particularly economical in terms of force, since the required axial force is approximately ⅔ below that of the axial upsetting method.

The invention is not restricted to the illustrated and described exemplary embodiments but also comprises all embodiments which in the context of the invention have identical effects. It is explicitly stressed that the exemplary embodiments are not limited to all intercombined features, but rather each individual sub-feature may also be of inventive relevance when considered so as to be separate from all other sub-features. Furthermore, the invention to this point is also as yet not restricted to the combination of features which is defined in the respective independent claim but may be defined by any other combination of specific features of the entirety of all disclosed individual features. This means that in principle practically any individual feature of the respective independent claim may be omitted or be replaced by at least one individual feature which is disclosed in another part of the application, respectively. To this extent the claims are to be understood as only an initial attempt at wording an invention.

The invention claimed is:

1. A pipe connection for connecting a metallic thin-walled pipeline, comprising
    a pipeline having a formed connection portion which emanating from the connection end thereof increases in a truncated-cone shaped manner at a first cone angle ($\alpha$) and there on the outer circumferential face thereof forms an encircling sealing face and, adjoining thereto, has a shoulder having a locating face,
    and a connector port having a connector thread and a connector bore which emanating from the opening thereof decreases in a truncated-cone shaped manner at a second cone angle ($\alpha'$) which is adapted to the first cone angle ($\alpha$) of the connection portion in the region of the sealing face and there on the inner circumference forms an encircling connector face bearing on the sealing face, and a collar screw part having a tension thread and having a through opening which on the inner circumference has an encircling tension face for bearing on the locating face, wherein the connection portion from the shoulder up to the original pipe circumference decreases in a truncated-cone shaped manner at a third cone angle (β) and there on the outer circumferential face thereof forms an encircling locating face, wherein the through opening of the collar screw part adjoining the tension thread decreases in a truncated-cone shaped manner at a fourth cone angle (β') which is adapted to the third cone angle (β) of the connection portion in the region of the locating face and there on the inner circumference forms an encircling tension face bearing on the locating face, wherein the first cone angle (α) of the connection portion in the region of the sealing face and the second cone angle (α') of the connector bore in the region of the connector face are in the range of about 38° to 50°, the third cone angle (β) of the connection portion in the region of the locating face and the fourth cone angle (β') of the through opening in the region of the tension face is larger than the first cone angle (α) of the connection portion in the region of the sealing face by at least 90°, wherein the first, second, third and fourth cone angles are measured as opening angles of respective cones defined thereby.

2. The pipe connection as claimed in claim 1, wherein the first cone angle (α) of the connection portion in the region of the sealing face, and the second cone angle (α') of the connector bore in the region of the connector face are in the range of about 38° to 42°.

3. The pipe connection as claimed in claim 1, wherein the third cone angle (β) of the connection portion in the region of the locating face, and the fourth cone angle (β') of the through opening in the region of the tension face are in the range of about 120° to and including 180°.

4. The pipe connection as claimed in claim 1, wherein the third cone angle (β) of the connection portion in the region of the locating face, and the fourth cone angle (β') of the through opening in the region of the tension face is one of 140° or 180°.

5. The pipe connection as claimed in claim 1, wherein the shoulder has a height (H) which is in the range of about 0.5 mm to 5 mm, and the shoulder directly adjoins the sealing face.

6. The pipe connection as claimed in claim 1, wherein the following applies to the ratio of the wall thickness (s) of the pipe wall of the pipeline to the outer diameter (d) of the pipeline is about 0.04≤s/d≤0.08.

7. The pipe connection as claimed in claim 1, wherein the connector bore has a locating face for axially delimiting the tightening path of the pipeline.

8. The pipe connection as claimed in claim 1, wherein the connector face of the connector bore has an encircling sealing groove for receiving a seal.

9. The pipe connection as claimed in claim 8, wherein the gasket is configured to adapt to the cone angle (α) of the connection portion in the region of the sealing face of the pipeline.

10. The pipe connection as claimed in claim 1, wherein a hollow-cylindrical sealing region, in which a gasket is disposed, adjoins the connector face in the connector bore.

11. The pipe connection as claimed in claim 1, wherein the collar screw part is configured as a cap nut, wherein the connector thread of the connector port is configured as an external thread on the outer circumference of the connector port, and the tension thread is configured as an internal thread on the inner circumference of the through opening of the cap nut.

12. The pipe connection as claimed in claim 1, wherein the collar screw part is configured as a cap screw, wherein the connector thread of the connector port is configured as an internal thread on the inner circumference of the connector bore of the connector port, and the tension thread is configured as an external thread on the outer circumference of the cap screw.

13. The pipe connection as claimed in claim 1, wherein a baffle ring is disposed in such a manner between that tension face of the collar screw part that faces the connector port and the locating face of the pipeline that conjoint rotation of the pipeline during final assembly of the pipeline is prevented.

14. The pipe connection as claimed in claim 13, wherein the baffle ring has a mating face which bears on the locating face and which in its inclination in relation to the longitudinal axis (X-X) of the pipe connection is adapted to the inclination of the locating face according to the cone angle (β).

15. The pipe connection as claimed in claim 13, wherein the baffle ring has a bearing face which lies opposite the tension face of the collar screw part, wherein the tension face and the bearing face are preferably oriented so as to be perpendicular to the longitudinal axis (X-X) of the pipe connection.

16. The pipe connection as claimed in claim 1, wherein the first and second cone angles are about 40°.

17. The pipe connection as claimed in claim 1, wherein the shoulder has a height (H) which is in the range of about 0.5 mm to 3 mm.

18. The pipe connection as claimed in claim 1, wherein the shoulder has a height (H) which is in the range of about 1 mm to 2 mm.

* * * * *